May 13, 1941.　　　P. W. NEEDHAM　　　2,241,866
REAR VIEW MIRROR
Filed June 25, 1940　　　2 Sheets-Sheet 1
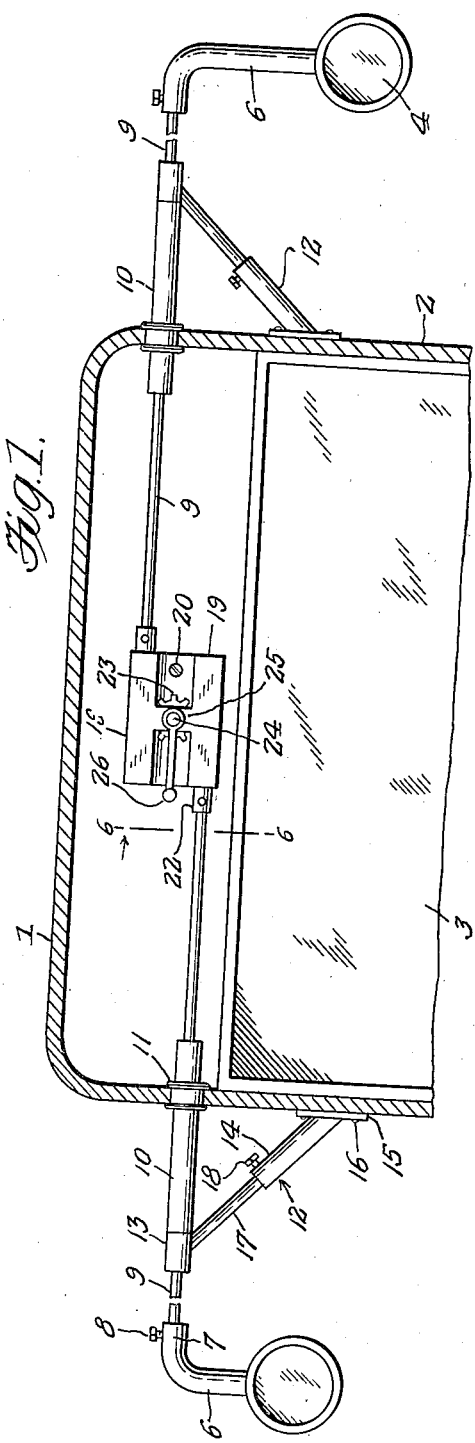
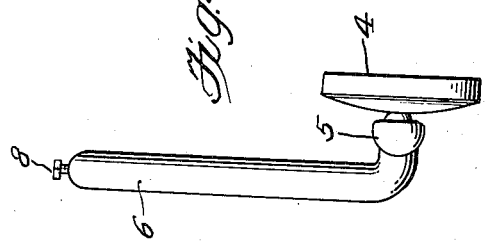
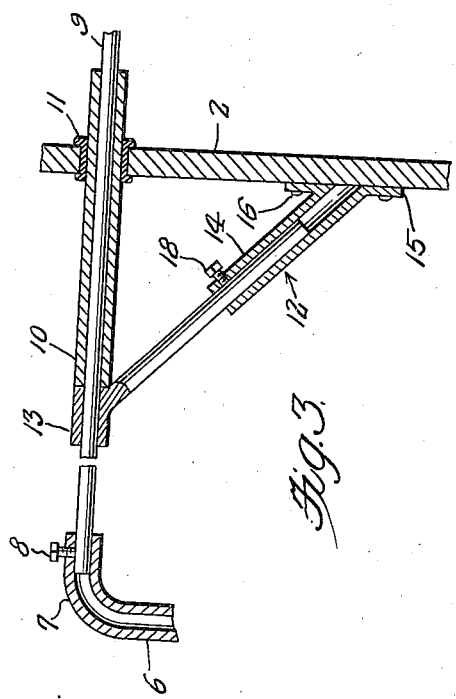
Inventor
Paul W. Needham.
By Clarence A. O'Brien
Attorneys May 13, 1941.	P. W. NEEDHAM	2,241,866
REAR VIEW MIRROR
Filed June 25, 1940	2 Sheets-Sheet 2
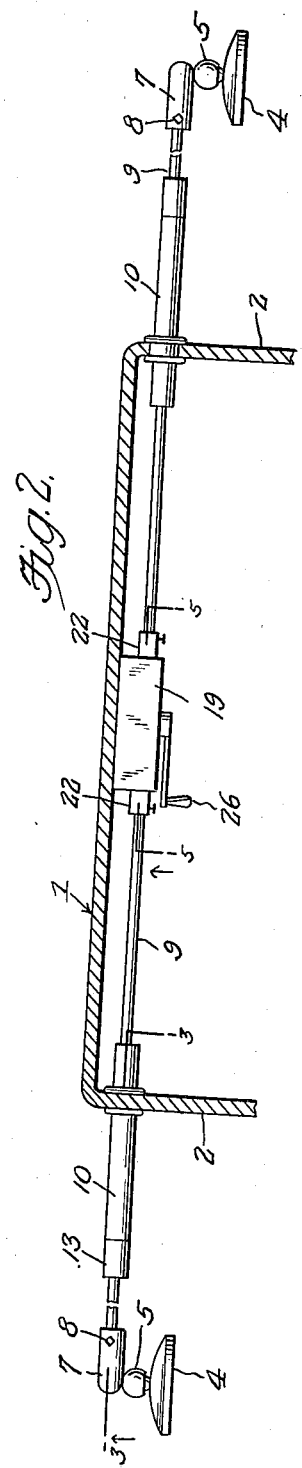
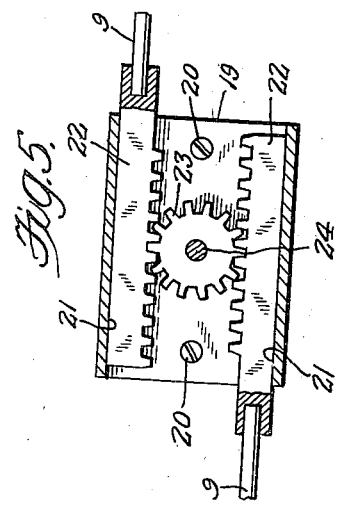
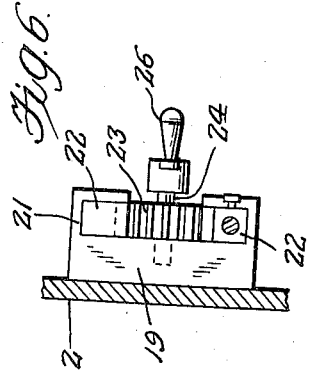
Inventor
Paul W. Needham,
By Clarence A. O'Brien
Attorneys Patented May 13, 1941

2,241,866

UNITED STATES PATENT OFFICE 2,241,866

REAR VIEW MIRROR

Paul W. Needham, South St. Paul, Minn.

Application June 25, 1940, Serial No. 342,386

1 Claim. (Cl. 88—86)

My invention relates to improvements in rear view mirrors for automobile trucks, and is designed with the particular object in view of equipping such vehicles inexpensively with duplex mirrors on opposite sides of the cab mounted for wide range of adjustments toward and away from the sides of the cab to facilitate viewing the road and traffic in the rear more particularly in backing and parking and so obviate accidents frequently occurring during such operations of these vehicles.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a fragmentary view in transverse section through the cab of an automobile truck equipped with the preferred embodiment of my invention, Figure 2 is a view partly in top plan and partly in horizontal section, Figure 3 is a view in longitudinal vertical section taken on the line 3—3 of Figure 2, Figure 4 is a view in side elevation of one of the mirrors and supporting arm therefor, Figure 5 is a view in longitudinal section taken on the line 5—5 of Figure 2, and Figure 6 is a view in transverse section taken on the line 6—6 of Figure 1.

Referring to the drawings by numerals, I have shown my invention therein as applied to a portion of the cab 1 of an automobile truck, 2 designating the sides of the cab and 3 the windshield.

According to my invention, a pair of disk-type rear view mirrors 4 are mounted upon opposite sides of said cab 1 as follows.

Each mirror 4 is secured by a universal ball and socket joint 5, to the lower end of a supporting arm 6 having a goose-neck, socketed upper end 7 by means of which and set screw 8, said arm is detachably secured to the outer ends of one of a pair of mirror adjusting rods 9 which are telescoped in the socketed ends 7 of said arms so that the arms depend from the rods. The rods 9 are mounted in horizontal, vertically spaced, parallel relation at opposite sides 2 of the cab, respectively, to extend through said sides. For mounting the rods 9 a pair of tubular metal guides 10 are extending through opposite sides 2 of the cab at different appropriate levels and horizontally, said guides being suitably secured in a pair of flanged, rubber bushings 11, respectively, fixed in said sides 2, said guides extending outwardly from said sides 2 for any desired distance, and the rods 9 being endwise slidable in the guides. A pair of braces 12 are provided on opposite sides 2 of the cab 1 to incline upwardly and outwardly therefrom and which terminate in a pair of upper bushings 13 opposed to the outer ends of the guides 10 and through which said rods 9 are also slidably extended.

The braces 12 each include a tubular base section 14 having an end flange 15 bolted, as at 16, to the sides 2 of cab 1, and a rod section 17 carrying the bushing 13 and clamped in the section by a set screw 18 in said section. The described sectional braces 12 provide for easily attaching the same to the cab 1 and aligning the bushing 13 with the guides 10.

Means are provided for moving the rods 9 outwardly and inwardly comprising a rectangular guide block 19 fixed to the upper front wall portion of the cab 1 above the windshield 3 as by screws 20, said block having a pair of upper and lower horizontal guideways 21 therein as best shown in Figure 6. A pair of rack bars 22 are slidably mounted in said guideways 21 and suitably attached to the inner ends of rods 9 to extend therefrom. A gear pinion 23 is rotatably mounted in said block 19, centrally thereof, and intermediate the rack bars 22 to mesh with the latter. The pinion 23 is fast on a stud 24 having a rear end journalled in the block 19 and its front journalled in a bearing boss 25 on said block, the stud extending out of the front face of the bearing block. A crank 26 on the extending end of the stud 24 provides for rotating the same and said pinion in opposite directions respectively.

The operation of the described invention will be readily understood. Under rotation of the pinion 23 in one direction, by means of the crank 26, the rods 9 may be slid outwardly in the guides 10 and bushings 13 to adjust the mirrors 4 outwardly of the cab 1 into different set positions, selectively. Conversely, rotation of the pinion 23 in the opposite direction will effect movement of the rods 9 inwardly to adjust said mirrors 4 correspondingly toward said cab so as to position the same as required for normal use in driving.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

Apparatus of the class described for mounting on the cab of an automobile truck comprising a pair of tubular guides for extension in fixed horizontal position through opposite sides of said cab, respectively, a pair of rods endwise slidable in said sleeves in relatively opposite directions, and having opposed inner ends, a pair of rear view mirrors mounted on the outer ends of said rods, respectively, and manipulative means adapted to be mounted in fixed position in said cab and operatively connected to said inner ends of said rods to slide the same at will, said means comprising a guide block adapted to be mounted in fixed position in said cab, a pair of rack bars slidably mounted in said block and connected to the inner ends of said rods, respectively, a stud journalled in said block, a hand crank for operating said stud, and a gear pinion fast on said stud and meshing with both rack bars.

PAUL W. NEEDHAM.